(12) United States Patent  
Cascolan et al.

(10) Patent No.: US 9,416,805 B2  
(45) Date of Patent: Aug. 16, 2016

(54) SOLENOID COUPLING WITH ELECTRICAL PULSE RELEASE

(71) Applicant: Magnet-Schultz of America, Inc., Westmont, IL (US)

(72) Inventors: Anthony Cascolan, Lombard, IL (US); Roland Mueller, Wheaton, IL (US)

(73) Assignee: Magnet-Schultz of America, Inc., Westmont, IL (US)

( * ) Notice: Subject to any disclaimer, the term of this patent is extended or adjusted under 35 U.S.C. 154(b) by 0 days.

(21) Appl. No.: 14/870,911

(22) Filed: Sep. 30, 2015

(65) Prior Publication Data

US 2016/0017905 A1 Jan. 21, 2016

Related U.S. Application Data

(63) Continuation-in-part of application No. 14/592,511, filed on Jan. 8, 2015.

(60) Provisional application No. 61/942,882, filed on Feb. 21, 2014.

(51) Int. Cl.
   *H01F 7/124* (2006.01)
   *F16B 7/04* (2006.01)
   *H01F 7/16* (2006.01)

(52) U.S. Cl.
   CPC .............. *F16B 7/042* (2013.01); *H01F 7/124* (2013.01); *H01F 7/1607* (2013.01)

(58) Field of Classification Search
   CPC ... H01F 7/1607; H01F 7/124; E05B 47/0002; E05B 47/0603; E05B 47/0004; E05B 2047/0007; E05B 63/121; F42B 10/14; F42B 10/64; F01L 2820/031; F16B 7/042
   See application file for complete search history.

(56) References Cited

U.S. PATENT DOCUMENTS

| | | | |
|---|---|---|---|
| 3,245,423 A | 4/1966 | Hansen et al. | |
| 4,198,080 A | 4/1980 | Carpenter | |
| 5,494,323 A | 2/1996 | Huang | |
| 5,540,250 A | 7/1996 | Mullins | |
| 5,829,280 A | 11/1998 | Chen | |
| 7,125,058 B2 | 10/2006 | Hawthorne | |
| 2010/0237637 A1 | 9/2010 | Camp | |
| 2013/0307280 A1 | 11/2013 | Camp | |

*Primary Examiner* — Mohammad Musleh  
(74) *Attorney, Agent, or Firm* — Knechtel, Demeur & Samlan

(57) ABSTRACT

A solenoid operated locking mechanism uses a permanent magnet to secure a lockable rod to the solenoid locking mechanism. A solenoid operated plunger determines the location and movement of locking members that extend into a locking chamber, thus controlling the movement of the lockable rod past the locking members. Inserting the lockable rod into the locking mechanism forces the plunger against a spring toward a permanent magnet that holds the plunger in the locked position until an electrical pulse energizes the solenoid which reduces or cancels the permanent magnet's magnetic field and allows the lockable rod to be withdrawn from the locking chamber. The locking mechanism only requires energy to be applied to the solenoid to release the locking rod from the solenoid. The locking mechanism only requires energy to be applied to the solenoid to release the locking rod from the solenoid.

9 Claims, 12 Drawing Sheets

SOLENOID COUPLING WITH ELECTRICAL PULSE RELEASE

CROSS-REFERENCE TO RELATED APPLICATION

This application is a continuation-in-part application based on and claims priority of patent application Ser. No. 14/592,511 filed Jan. 8, 2015 which is based on and claims the priority of provisional patent application 61/942,882 filed Feb. 21, 2014.

BACKGROUND AND SUMMARY OF THE INVENTION

This invention relates to mechanical couplings generally used to connect one apparatus or device to another. In particular it is directed to a quick release ball detent mechanical coupling that uses an electric solenoid to release the locked coupling.

In specific applications, it is desirable to connect a piece of equipment to a stationary object with a releasable coupling. In the past, mechanical couplings used to connect a device in place, such as a grill top, relied on strictly manually operated mechanical locking mechanisms to lock and unlock the device to the coupling. These worked fairly well but have several shortcomings. First, to unlock the coupling the user has to physically unlatch the locking mechanism. This may be difficult for the user, especially if the user suffers from some form of disability that makes it difficult to manipulate or operate the release mechanism. Furthermore, the location of the coupling may be difficult to reach. Also, the coupling cannot be remotely unlatched by means of a wired or wireless switch. Latch assemblies or blocking device as illustrated in the prior art create more mounting or space constraint issues due to their profile or package size configurations. An electromagnet in a similar small package size may not have enough holding power to be effective in the given application. In addition, it is more difficult to design an enclosure or protective cover around a latch type assembly, blocking device or electromagnet which would be required to prevent contamination from entering the latch assembly.

Applicant's invention overcomes the problems associated with the mechanical couplings of the prior art. An electrically operated solenoid operates a plunger that keeps the latching mechanism either in the locked position or allows the latching mechanism to move to the unlocked position to allow the coupling to release the device.

The invention has a ball detent mechanism that provides a locking and unlocking feature when coupled with the mating receptacle. A solenoid electrically actuates the latch/unlatch ball detent mechanism. Depending on the design, by energizing or de-energizing the solenoid, the ball detent mechanism either locks or unlocks the coupling from the mating receptacle. A mechanical override feature is provided to operate the ball detent mechanism in the event of a solenoid failure.

In an alternate embodiment the solenoid locking mechanism secures a lockable rod to the solenoid locking mechanism. A plunger operated by the solenoid locks or releases one or more ball bearings from a passageway through which the lockable rod must pass to a locking chamber or socket. Depending on the configuration of locking flats and recesses on the plunger, the ball bearings can be oriented to allow the lockable rod to enter the locking chamber or socket or be restricted from entering. The configuration also allows the ball bearings to lock the lockable rod in the locking chamber or socket when desired.

In a third embodiment the locking mechanism uses a permanent magnet to secure the lockable rod to the solenoid locking mechanism. In this embodiment the locking mechanism remains in the unlocked position ready to receive the lockable rod once the solenoid operated locking mechanism is energized to unlock it. Mechanical movement of the lockable rod forces the plunger against a spring toward a permanent magnet that holds the plunger in the locked position until an electrical pulse energizes the solenoid which reduces or cancels the permanent magnet's magnetic field and allows the lockable rod to be withdrawn from the locking chamber. Thus, the only time that one energizes the solenoid is to unlock the solenoid locking mechanism, and then no further electrical energy is supplied to the locking mechanism.

DESCRIPTION OF THE PREFERRED EMBODIMENT

Figure 1:
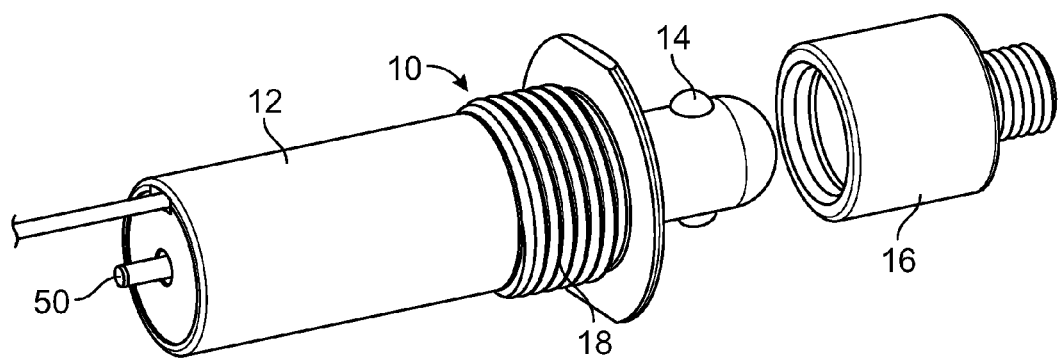
FIG. 1 is a perspective view of the first embodiment of the inventive solenoid coupling removed from the mating receptacle.
Figure 2:
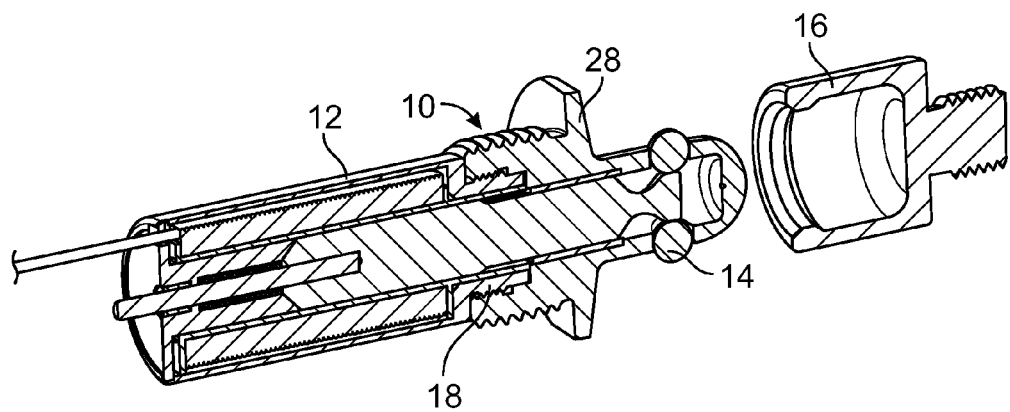
FIG. 2 is a cross sectional view taken longitudinally along the solenoid coupling and mating receptacle.

Turning first to FIGS. 1 and 2, there is illustrated a first embodiment of a solenoid latching mechanism 10 of the present invention. There is an electrically operated solenoid 12 operating a ball detent mechanism 14. The ball detent mechanism 14 fits into a mating receptacle 16 that is connected to a tube or conduit or similar apparatus. The threaded front end 18 of the solenoid 12 is used for mounting the solenoid latching mechanism 10 by means of a hex nut 19 and lock washer 21.

Figure 3:
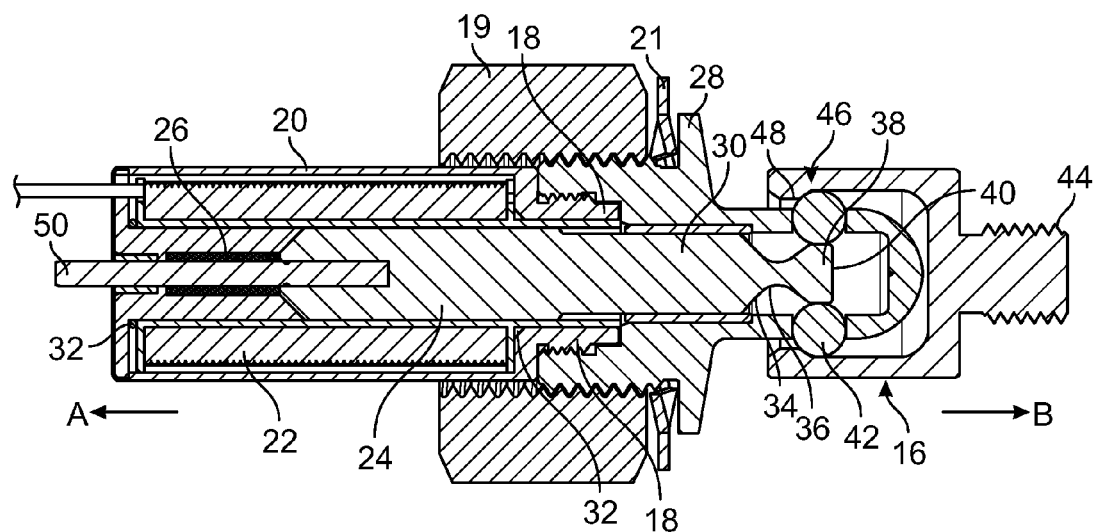
FIG. 3 is a cross sectional view taken longitudinally across the solenoid coupling and mating receptacle in the energized or locked position.

FIG. 3 illustrates the mechanism 10 in the locked position. The solenoid 12 comprises a solenoid body or housing 20, a coil 22, and a plunger or operating arm 24. With power applied to the solenoid 12, the plunger moves in the direction of arrow "A" against the force exerted by spring 26. A housing 28 is screwed onto the threaded front end 18 and secured by the hex nut 19 and lock washer 21. The housing 28 is in axial alignment with the solenoid body 20. The plunger 24 has a plunger tip 30. In this embodiment the plunger 24 and plunger tip 30 are illustrated as a singular piece. However, this can be configures as two pieces with one end of the plunger 24 screwed into the end of the plunger tip 30. When two pieces are used and attached to each other, the plunger 24 and plunger tip 30 can move axially as one piece within the solenoid body 20 and housing 28. The plunger 24 has o-rings 32 disposed around its circumference to seal out contaminants. The plunger tip 30 has a tapered shoulder 34 that drops to a depression 36 and then rises to a head 38 with a plateau top 40. The housing 28 retains at least a pair of ball bearings 42, but more than two can be used.

The mating receptacle 16 has a threaded end 44 and a coupling end 46. At the internal portion of the coupling end 46 is an internal collar 48. In the position illustrated in FIG. 3, the coupling is illustrated in the energized and locked position. This is due to the plunger being pulled by the solenoid in the direction of arrow "A", which draws the plunger tip 30 in this same direction "A". The head 30 and the plateau top 40 force the ball bearings 42 outward from the longitudinal axis of the plunger tip 30 where they will remain until power to the solenoid is removed. With the ball bearings 42 in this position, the coupling end 46 and internal collar 48 cannot move in the direction of arrow "B" and the housing 28 is locked to the mating receptacle 16.

Figure 4:
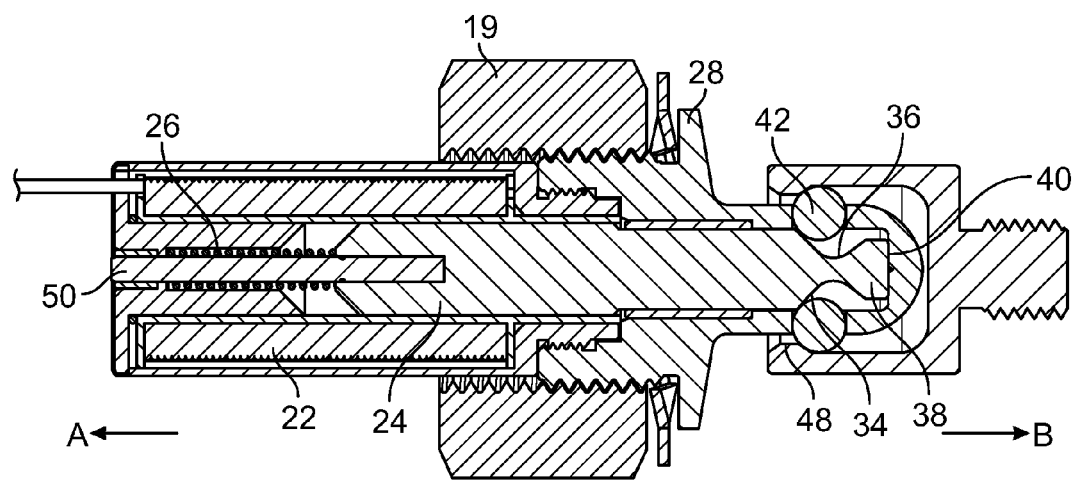
FIG. 4 is a cross sectional view taken longitudinally across the solenoid coupling and mating receptacle in the de-energized or unlocked position.

FIG. 4 illustrates the coupling mechanism 10 when in the de-energized or unlocked position. With no power being supplied to the solenoid coil 22, the plunger 24 is free to move in the direction of arrow "A". However, the spring 26 pushes the plunger 26 in the direction of arrow "B". This initially causes the ball bearings 42 to move inward toward the depression 36 and then ride up the tapered shoulder 34 to push the ball bearings 42 outward from the longitudinal axis of the plunger tip 30. The ball bearings 42 apply a force against the internal collar 48 proportional to the force applied by the spring 26. By manually pulling on the mating receptacle 16 in the direction of arrow "B", the collar 48 will force the ball bearings 42 down along the tapered shoulder 34 and into the depression 36. This releases the collar 48 from the ball bearings 42 and allows the mating receptacle 16 to be removed from the housing 28.

Figure 5:
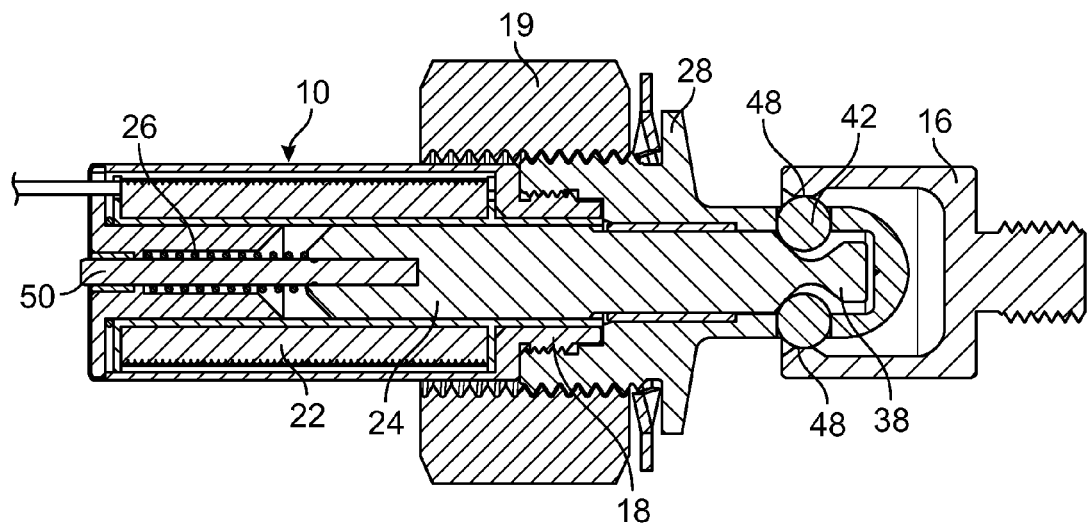
FIG. 5 is a cross sectional view taken longitudinally across the solenoid coupling and mating receptacle in the de-energized to override position.

FIG. 5 illustrates the coupling mechanism 10 in the de-energized to override position. In this position the solenoid 12 is not energized and the plunger 24 is not attracted to the pole piece in the direction of arrow "A". The plunger 24 and plunger tip 30 stay in the extended position due to the force exerted by the spring 26 as seen in FIG. 5. In this override position, the profile of the tapered shoulder 34 will cause the ball bearings 42 to move outward, but will not block the internal collar 48 from releasing the mating receptacle 16. In this position, the ball bearings 42 remain in the outward position and provide a sealing feature to keep contaminants away from the interior of the housing 28. If the solenoid should jam or become inoperative, the Manual override pin 50 can be pushed in to unlock the mating receptacle 16.

An alternate embodiment of a solenoid latching mechanism 54 is illustrated in FIGS. 6-9. The solenoid latching mechanism 54 has a solenoid body 56 with a solenoid coil 58 that is energized through an electrical wire 59. The coil 58 is separated from the solenoid body 56 by a coil winding gap 60. Centrally disposed within the body 56 is a sleeve 62, preferably made from stainless steel. The sleeve 62 has a tapered or cone shaped opening 64 at one end of the sleeve. The tapered opening 64 channels down into a cylindrical locking chamber or socket 66. The latching mechanism 54 can be mounted by means of a hex nut and washer such as illustrated in FIGS. 1 and 2 but not illustrated for clarity in FIG. 6.

Figure 6:
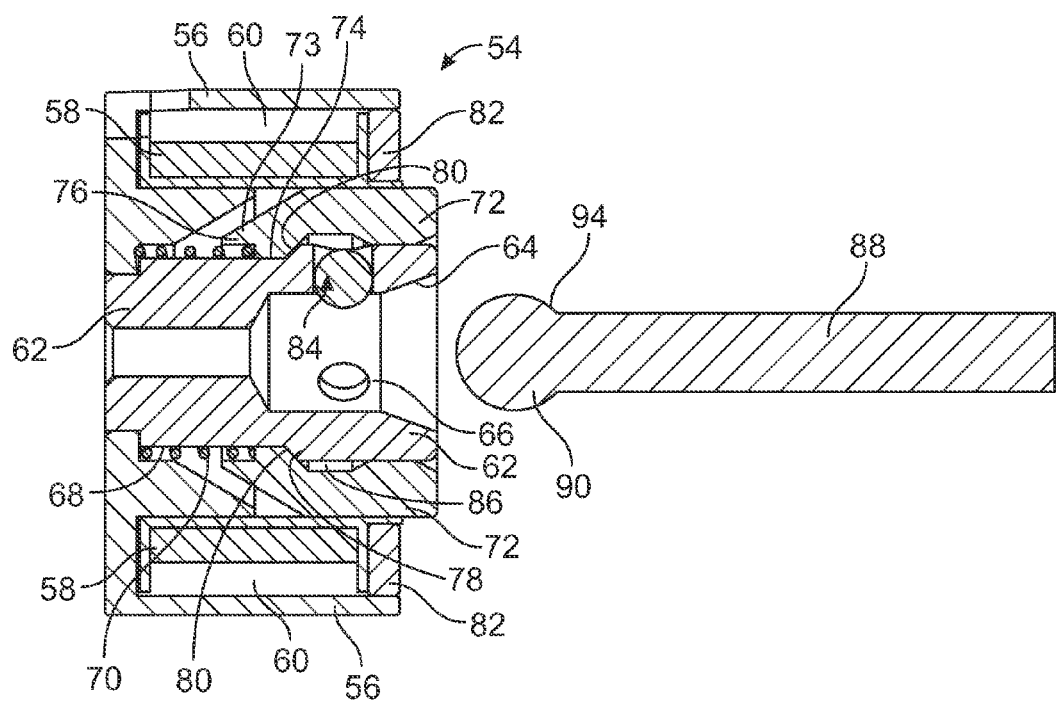
FIG. 6 is a cross sectional view of an alternate embodiment taken longitudinally across the solenoid coupling and mating lockable rod in the unlocked position with the lockable rod removed from the solenoid coupling mechanism.

Opposite the tapered opening 64, the sleeve 62 has a groove 68 cut around its circumference. Disposed around the groove 68 is a compression spring 70. Mounted around the sleeve 62 is a plunger 72 which is held captive within the solenoid body 56. The plunger 72 is cylindrical and is mounted in the solenoid body 56 so that the central opening of the plunger encompasses the sleeve 62 and opening 64. As seen in FIG. 6, the plunger has a leading edge 73, a foot 74 and an extending finger 76. The finger 76 aids in retaining the spring 70 in a captive position around the sleeve 62. The plunger 72 is securely mounted in the solenoid body 56 by means of a stationary stepped portion 78 on the sleeve 62 which engages a tapered portion 80 on the plunder 72. The plunger 72 is free to slide longitudinally along the groove 68 between the stepped portion 78 to the point where the leading edge of the plunger 73 engages the wall of the sleeve 62.

In the first alternative embodiment there are steel washers 82 surrounding the plunger 72. The washers 82 are securely mounted in the solenoid body 56. In a second alternative embodiment the steel washers are replaced with radially magnetized magnets. The difference in operation of the latching mechanism will be described below.

Mounted within the sleeve 62 and surrounding the locking chamber or socket 66 is a plurality of hardened stainless steel ball bearings 84. Preferably there should be at least three bearings 84 but more may be used. There is a recess 86 on the inner wall of the plunger 72 which receives the ball bearings 84 at certain times during the latching or releasing process.

The latching mechanism 54 is adapted to receive a hardened steel lockable rod 88 in locking engagement so that the lockable rod is locked to the solenoid body 56 or selectively released therefrom. The steel lockable rod can be part of any one of numerous devices that are to be coupled to another device by means of the latching mechanism 54. The lockable rod 88 has a leading ball nose 90 which is the portion that is received in locking engagement with the locking mechanism 54 as will be described below.

Figure 7:
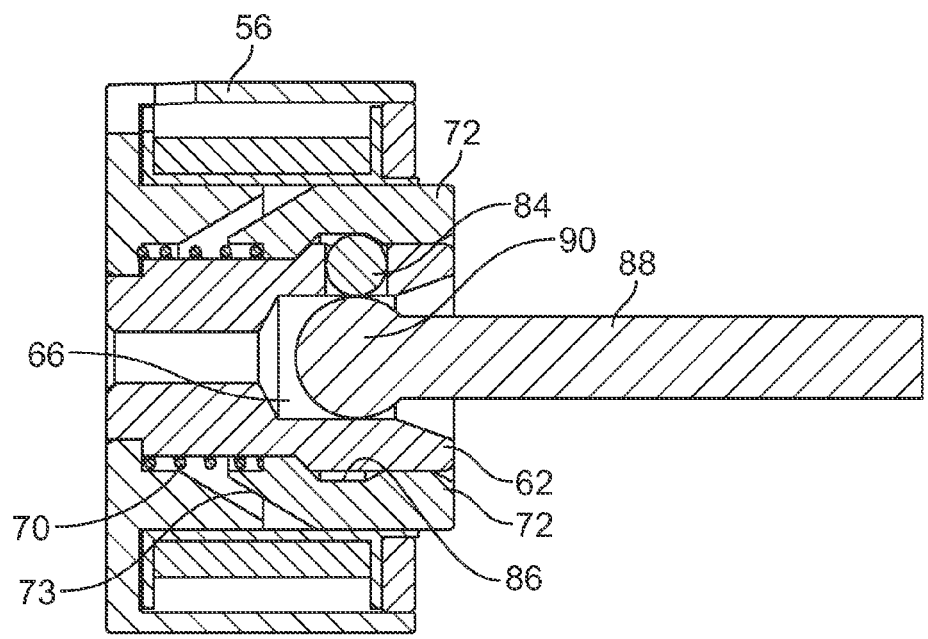
FIG. 7 is a cross sectional view of the alternate embodiment taken longitudinally across the solenoid coupling and mating lockable rod in the unlocked position with the lockable rod partially inserted into the solenoid coupling mechanism.
Figure 8:
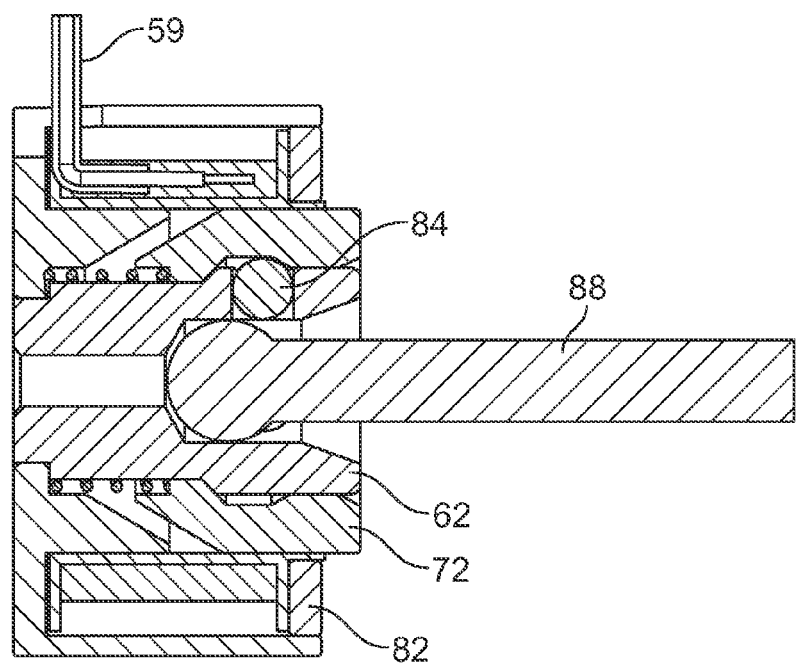
FIG. 8 is a cross sectional view of the alternate embodiment taken longitudinally across the solenoid coupling and mating lockable rod in the unlocked position with the lockable rod fully inserted into the solenoid coupling mechanism.
Figure 9:
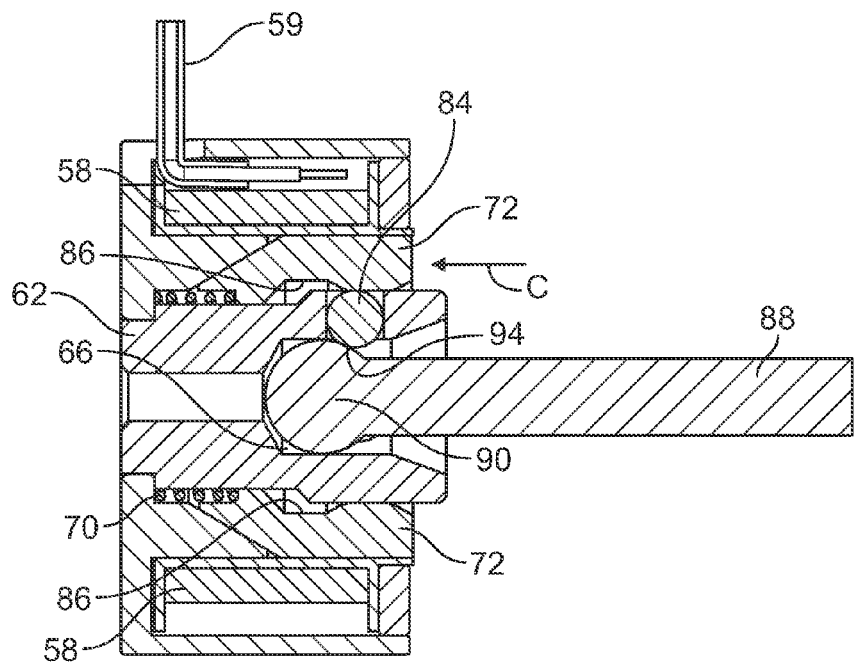
FIG. 9 is a cross sectional view of the alternate embodiment taken longitudinally across the solenoid coupling and mating lockable rod in the energized and locked position with the lockable rod fully inserted into the solenoid coupling mechanism.

The operation of the latching mechanism 54 will now be described. FIG. 6 illustrates the unlocked position with the steel lockable rod 88 out of the latching mechanism 54. In the first alternate embodiment wherein there are steel washers 82, the lockable rod 88 is pushed into the tapered opening 64. The tapered walls of the opening 64 assist in guiding the ball nose 90 into the opening 64 and allows for some misalignment. As seen in FIG. 7, the ball nose 90 pushes the ball bearings 84 into the recess 86 in the plunger 72. The depth of the recess 86 is sufficient to receive the ball bearings so that the ball nose 90 can travel past the ball bearings 84 and be fully received in the locking chamber or socket 66 as seen in FIG. 8. At this point the ball nose 90 is fully inserted into the locking chamber or socket 66 but is not locked therein and can be pulled back out of the latching mechanism 54. Power is then applied to the solenoid coil 58 which pulls the plunger 72 in the direction of arrow "C" as seen in FIG. 9. A locking flat 92 on plunger 72 pushes the ball bearing 84 down against a trailing edge 94 of the ball nose 90 which locks the ball nose 90 within the locking chamber or socket 66. As long as the solenoid coil 58 remains energized, the ball nose 90 remains locked in the locking chamber or socket 66. When power is removed from the solenoid coil 58, the lockable rod 88 can be removed. This provides a coupling that has a fail safe mode in the unlock position.

In FIGS. 10-13 there is illustrated a second alternate embodiment of the solenoid latching mechanism that operate essentially the same as the first alternate embodiment except utilizes a reconfigured plunger 72. In the second alternate embodiment the leading edge 73, foot 74, extending finger 76, and tapered portion 80 are the same as the first alternate embodiment. However the recess 86 and the locking flat 92 have been reconfigured as will be described below.

Figure 10:
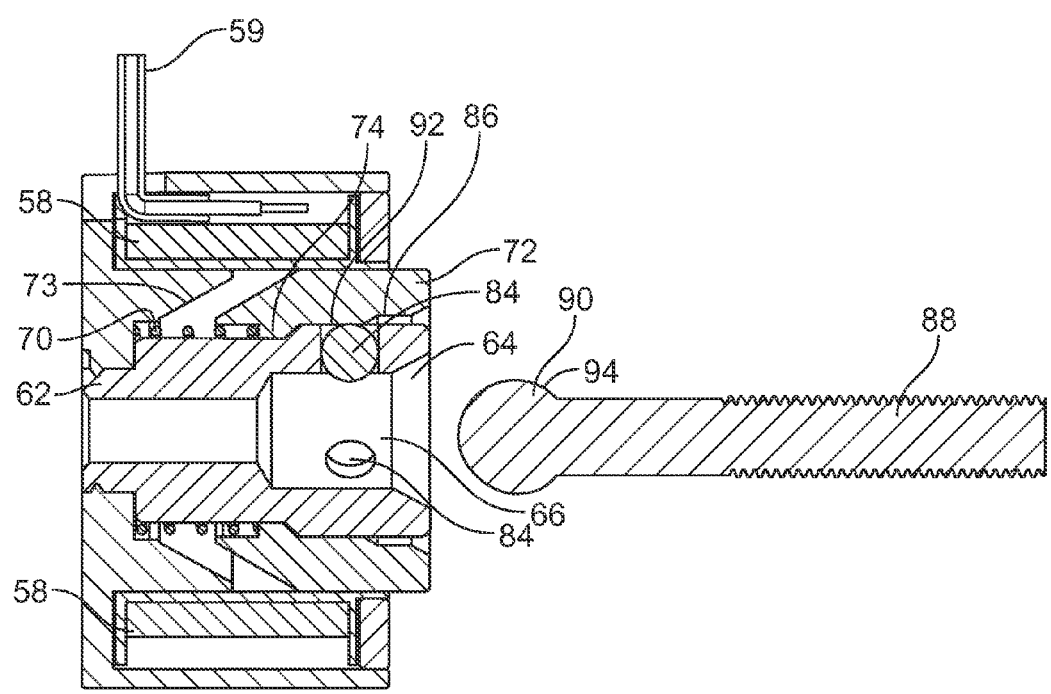
FIG. 10 is a cross sectional view of a second alternate embodiment taken longitudinally across the coupling and mating lockable rod in the de-energized locked position with the lockable rod removed from the solenoid coupling mechanism.
Figure 11:
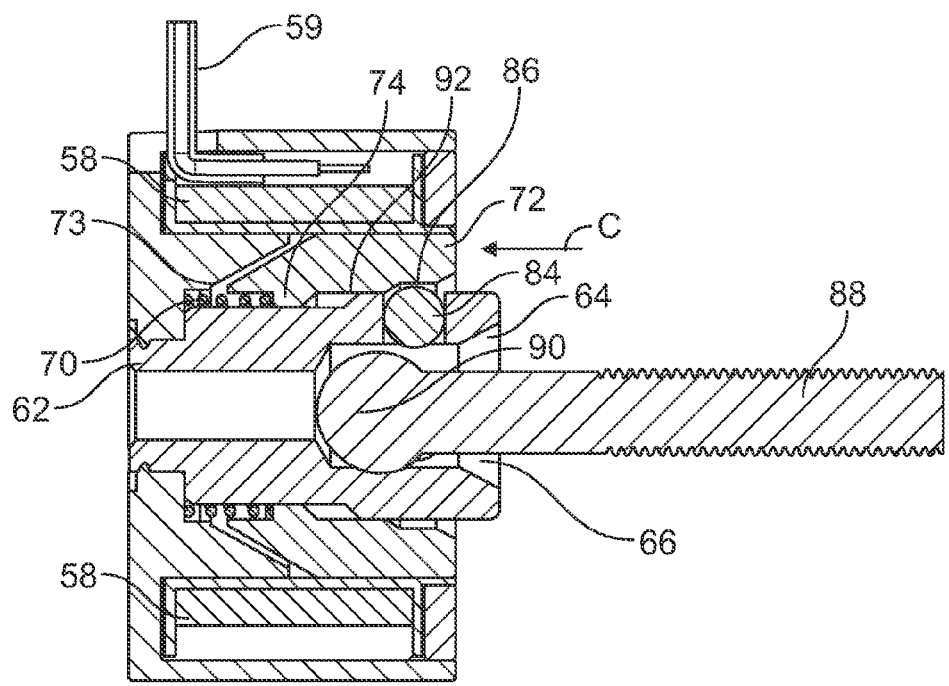
FIG. 11 is a cross sectional view of the second alternate embodiment in the energized to unlock position with the lockable rod fully inserted into the solenoid coupling mechanism.

In FIG. 10 one can see that the plunger 72 has the locking flat 92 moved toward the leading edge 73 with the recess 86 located near the end of the plunger opposite the leading edge 73 and adjacent to the end of the coupling having the tapered opening 64. In FIG. 10 the solenoid 58 is de-energized and the spring 70 pushes the plunger 72 toward the opening 64. The locking flat 92 pushes the ball bearings 84 into the locking chamber or socket 66. This prevents the ball nose 90 from entering into the locking chamber or socket and it is in effect "locked out".

Figure 12:
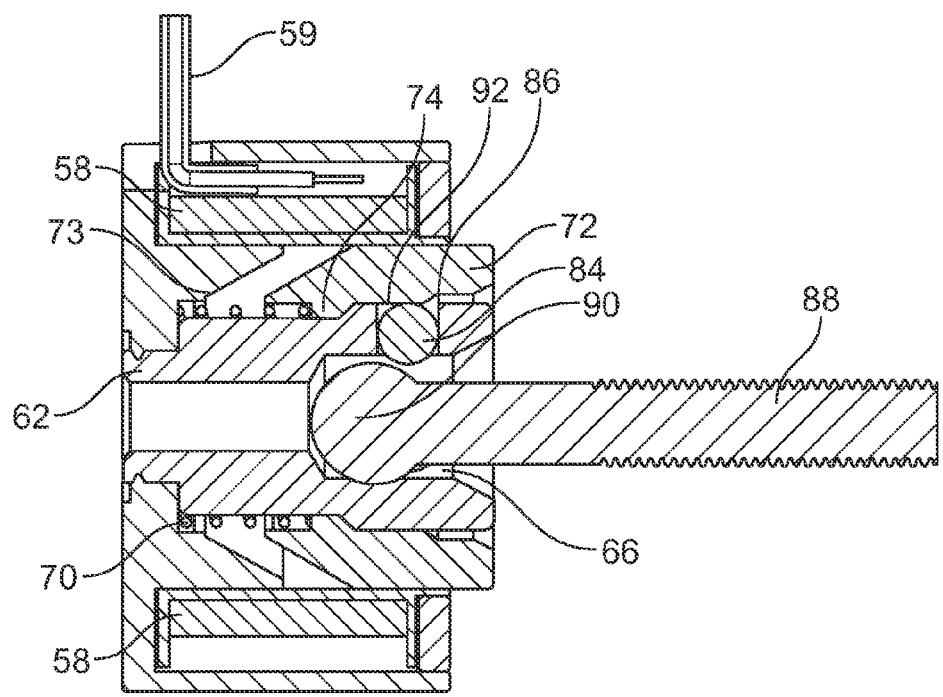
FIG. 12 is a cross sectional view of the second alternate embodiment in the de-energized to lock position with the lockable rod fully inserted into the solenoid coupling mechanism.

When the solenoid coil 58 is energized, the plunger 72 moves in the direction of arrow "C" and the recess 86 in the plunger allows the ball bearings 84 to be pushed outward from the locking chamber or socket 66. This allows the ball nose 90 to go past the ball bearings 90 and fully enter the locking chamber or socket 66. By de-energizing the solenoid coil 58, the spring 70 pushes the plunger 72 so that it moves in the direction opposite of arrow "C" and the ball nose 90 will be locked in the locking chamber or socket 66 such as illustrated in FIG. 12.

Figure 13:
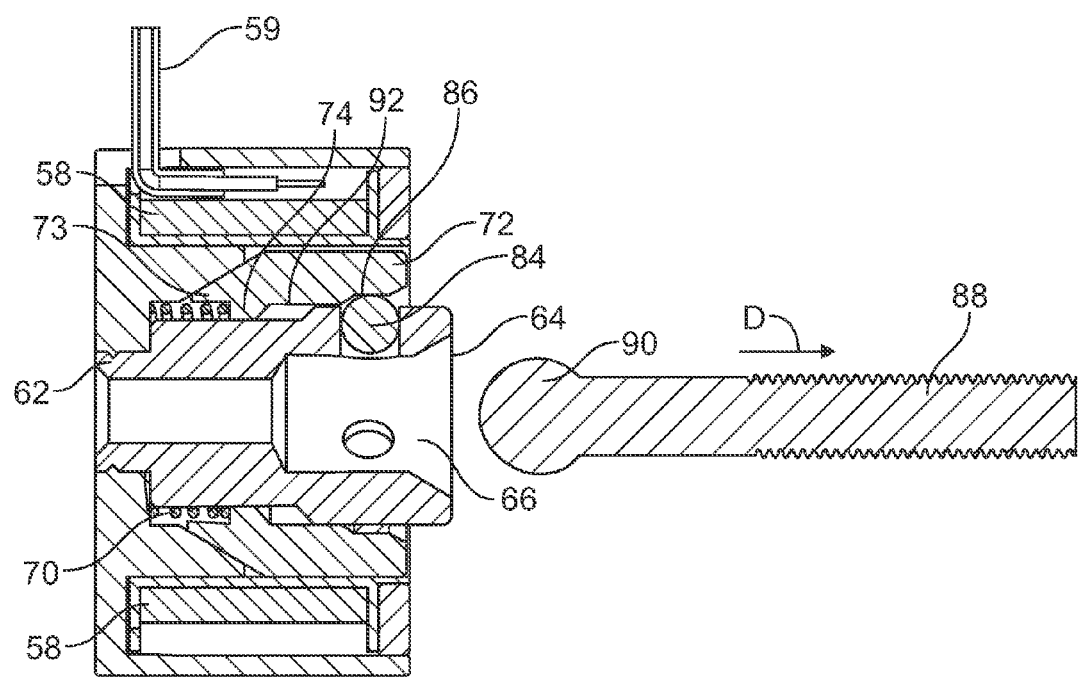
FIG. 13 is a cross sectional view of the second alternate embodiment in the energized to unlock position with the lockable rod removed from the solenoid coupling mechanism.
Figure 14:
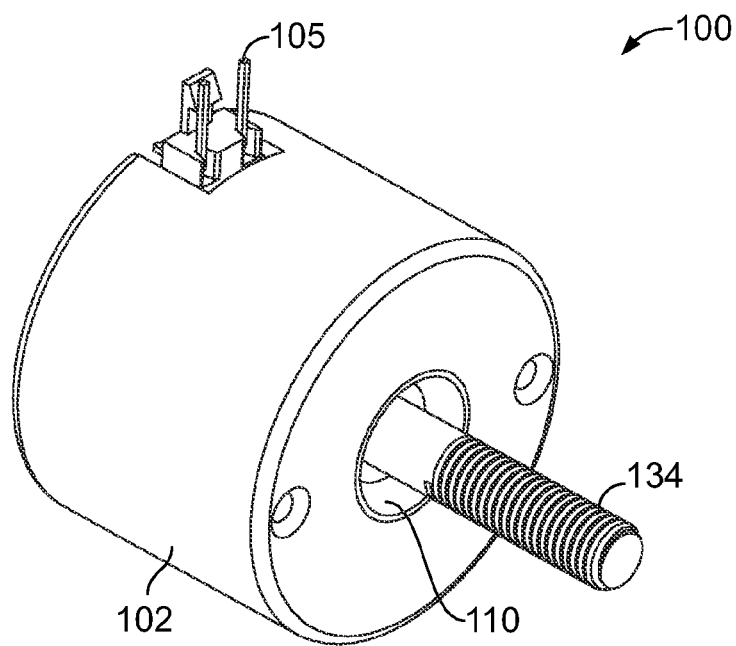
FIG. 14 is a front perspective view of the third alternate embodiment.
Figure 15:
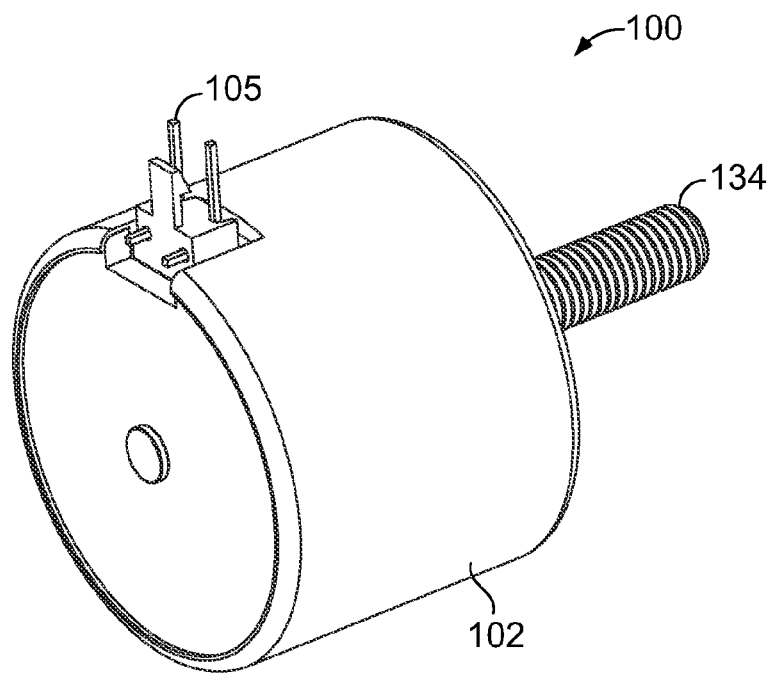
FIG. 15 is a rear perspective view of the third alternate embodiment.

In FIG. 13 the solenoid coil 58 is again energized which pulls the plunger 72 in the direction of arrow "C" which allows the ball bearings 84 to be pushed into the recess 86 when the lockable rod 88 is pulled backward in the direction of arrow "D". The ball nose 90 is thus allowed to be withdrawn from the locking chamber or socket 66 and withdrawn from the locking mechanism.

The second alternate embodiment illustrated in FIGS. 10-13 has the solenoid coil 58 configured to energize the coil to unlock the lockable rod 88 and de-energize the coil to lock the lockable rod 88. However, it should be noted that the solenoid 56 and plunger 72 can be designed with multiple internal configurations to provide different means for operating the solenoid and plunger mechanically and electrically. For example the solenoid coil 58 can be energized to either lock or unlock; the solenoid can be de-energized to either lock or unlock. The solenoid can be configured for fail-safe operation in which a latching solenoid is used with the latching solenoid will remain unlocked when no power is applied to the solenoid, or fail-secure operation in which the latching solenoid will remain locked when no power is applied to the latching solenoid. This can be configured by either using a pull or push type solenoid and a latching solenoid as is known to those skilled in the art.

Any number of combinations can be built by properly configuring the recess in the plunger to coordinate and operate in conjunction with energizing or de-energizing the solenoid coil 58 or, as stated above, using a latching solenoid. Also, the steel washers 82 can be replaced with radially magnetized magnets. This allows other variations of operation of the solenoid latching mechanism. For example when the steel washer 82 is replaced with a permanent magnet which is radially magnetized, the solenoid 56 will hold the plunger 72 in place without the need to continuously supply electrical energy to the coil 58. This embodiment that embeds a permanent magnet will produce a desired fail-safe holding force and also provide an additional energy savings benefit. The design requires that only a short pulse of electrical energy be applied to the coil 58 to affect pull-in or the release function of the plunger 72.

To attract and then hold the plunger 72 toward the solenoid 56, the polarity of the actuation pulse to the coil must be in synchronization with the permanent magnet. Once the plunger 72 is seated with the solenoid 56, the permanent magnet will securely hold the plunger 72 in place. To release the plunger 72 from the solenoid 56, an even shorter electrical pulse of opposite polarity to the permanent magnet is all that is required to nullify the magnet's hold and will release the plunger 72 away from the solenoid 56 with the aid of the spring 70. In either the pulled-in or the released state, the permanent magnet and spring combination requires "zero" continuous energy to remain in that state.

The inventive coupling with solenoid release locking mechanism is a great advantage over prior art ball detent locking mechanisms that relied on strictly manual mechanical means to release the coupling. By increasing the number of ball bearings in the housing, the force necessary to lock and unlock the housing from the mating lockable rod can be adjusted and varied.

The third alternate embodiment is illustrated in FIGS. 14-21. An electrically operated solenoid operated locking mechanism 100 is illustrated in the unlocked position. The solenoid locking mechanism 100 has a solenoid body or housing 102 with a solenoid coil 104 that is selectively energized through electrical wires 105. Centrally disposed within the body 102 are a plunger 106 and a sleeve 108. The plunger 106 surrounds the sleeve 108. The sleeve 108 is preferably made from stainless steel. The sleeve 108 has a tapered or cone shaped opening 110 at one end of the sleeve 108. The plunger 106 and sleeve 108 are held captive in the housing 102. The tapered opening 110 channels down into a cylindrical locking chamber 112 that has at least one ball bearing 114 mounted in the wall of the cylindrical locking chamber. Preferably three ball bearings 114 would be equally spaced around the cylindrical wall, but more or less can be used.

Figure 16:
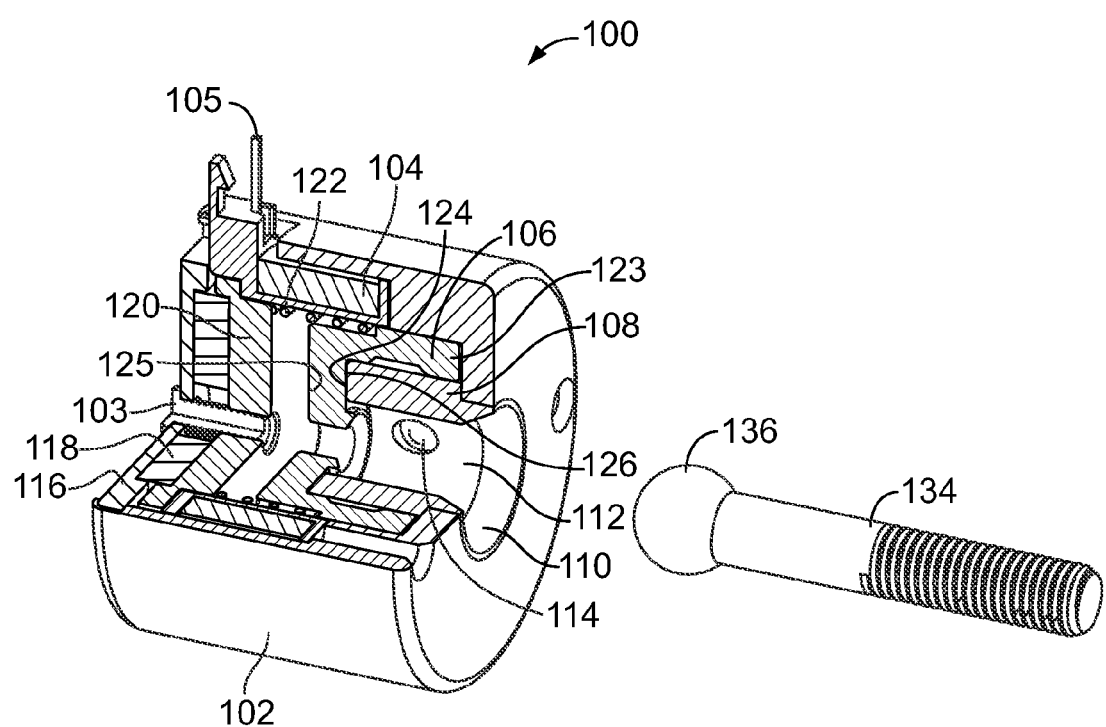
FIG. 16 is a perspective view of the third alternate embodiment partially in cross section showing the solenoid coupling in the unlocked position.

At the rear of the solenoid 100 is a rear washer 116 attached to the housing 102. A drive stud or fastener 103 holds a rear washer 116, a permanent magnet 118 and a shunt washer 120 in place. There is a spring 122 that has one end engaging the shunt washer 120 and the other end engaging the plunger 106. Thus the spring 122 is mounted and secured between the shunt washer 120 and the plunger 106 for providing a force against the plunger tending to force the plunger 106 toward the opening 110. As seen in FIG. 16, the plunger 106 has a leading end 123 and a locking surface or member 124 near a trailing end 125 of the plunger 106. The plunger 106 can slide longitudinally forward within the solenoid body 102 to the point where the locking surface 124 of the plunger 106 engages a stopping wall 126 which is part of the sleeve 108 which forms the cylindrical locking chamber 112. The plunger 106 can move in a rearward direction until the trailing end 125 engages the shunt washer 120.

Mounted within the sleeve 108 and surrounding the locking chamber 112 is a plurality of hardened ball bearings 128. Preferably there should be at least three ball bearings 128 but more or less may be used. The plunger 106 has a locking flat area 130 and a circular recess 132 on the inner perimeter of the inner wall of the plunger 106 which receives the ball bearings 128 at certain times during the latching (locking) or releasing (unlocking) process as will be explained below.

The solenoid operated locking mechanism 100 is adapted to receive a hardened steel lockable rod 134 in locking engagement so that the lockable rod 134 is locked to the solenoid body 102 or selectively released therefrom. The steel lockable rod 134 can be part of any one of numerous devices that are to be coupled to another device by means of the solenoid operated locking mechanism 100. The lockable rod 134 has a leading ball nose 136 which is the portion that is received in locking engagement with the solenoid operated locking mechanism 100 as will be described below.

Figure 17:
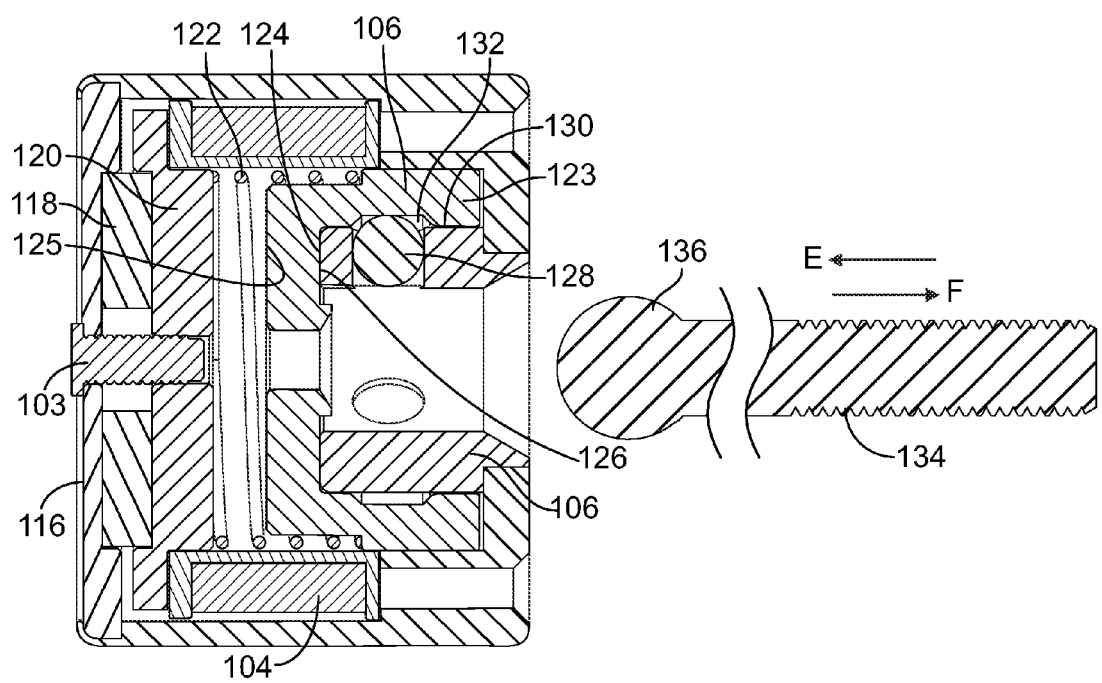
FIG. 17 is a cross sectional view of the third alternate embodiment taken longitudinally across the coupling in the unlocked position with the lockable rod removed.
Figure 18:
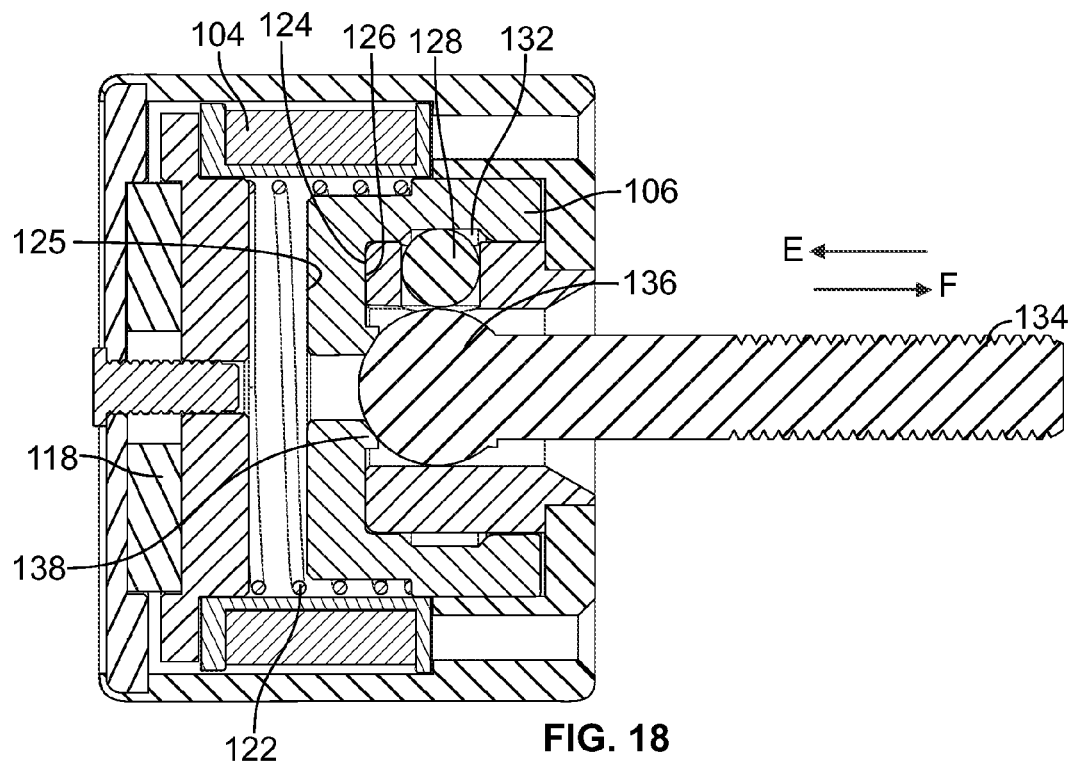
FIG. 18 is a cross sectional view of the third alternate embodiment taken longitudinally across the coupling in the unlocked position with the lockable rod inserted into the ball bearing housing within the coupling.

The operation of the solenoid operated locking mechanism 100 can be described in a step by step procedure by looking at FIGS. 17-21. FIG. 17 illustrates the solenoid operated locking mechanism 100 and the lockable rod 136 in the de-energized unlocked position with the ball nose 136 of the lockable rod 134 removed from but ready to be inserted into the tapered opening 110. In this position there is no power applied to the solenoid coil 104 and the solenoid operated locking mechanism 100 is in the unlocked and "cocked" or ready position to receive the lockable rod 134. The sleeve 108 is designed to retain the ball bearing 128 so that the ball bearing 128 is not fully released and will not drop into the locking chamber 112. The lockable rod 134 is then manually pushed in the direction of arrow "E" into the tapered opening 110. The tapered walls of the opening 110 assist in guiding the ball nose 136 into the opening 110 and allows for some misalignment. The lockable rod 134 is pushed further into the tapered opening 110 and into the locking chamber 112 as seen in FIG. 18. The ball nose 136 engages a ball receiving end or pocket 138 of the plunger 106 and pushes the plunger 106 rearward in the direction of Arrow E. The depth of the recess 132 is sufficient to receive the ball bearing 128 so that the ball nose 136 can travel past the ball bearing 128 and be fully received in the ball receiving end 138 of the plunger 106 as seen in FIG. 18.

Figure 19:
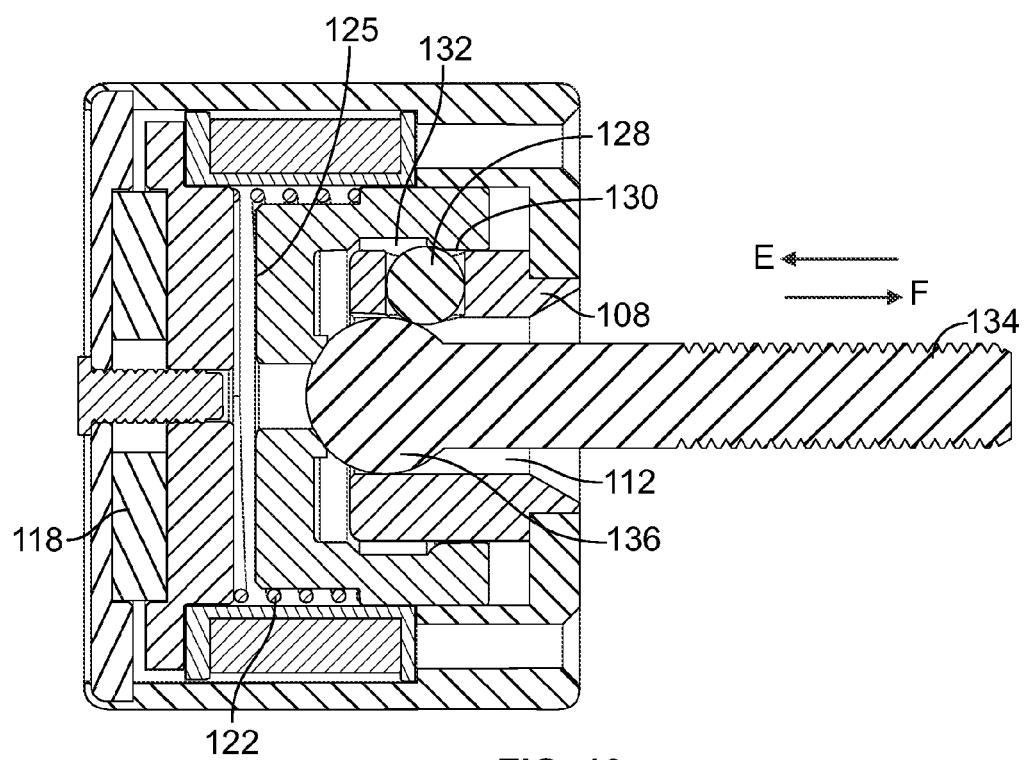
FIG. 19 is a cross sectional view of the third alternate embodiment taken longitudinally across the coupling in the unlocked position with the lockable rod inserted further into the coupling forcing the plunger toward the locked position.

FIG. 19 illustrates the position of the lockable rod 134 when continued insertion force is applied to the lockable rod 134 in the direction of arrow E. The plunger 106 continues moving in the direction of arrow E and compresses cylindrical spring 122. At this point the highest point of ball bearing 128 has passed the center line of ball bearing 128 and the ball bearing 128 is beginning to drop out of the recess 132 into the locking chamber 112. However, the ball nose 136 keeps substantially all of the ball bearing 128 in the sleeve 108. At this point the ball nose 136 is fully inserted into the receiving end 138 of the plunger 106 but is not locked therein and can be pulled back out of the solenoid operated locking mechanism 100.

Figure 20:
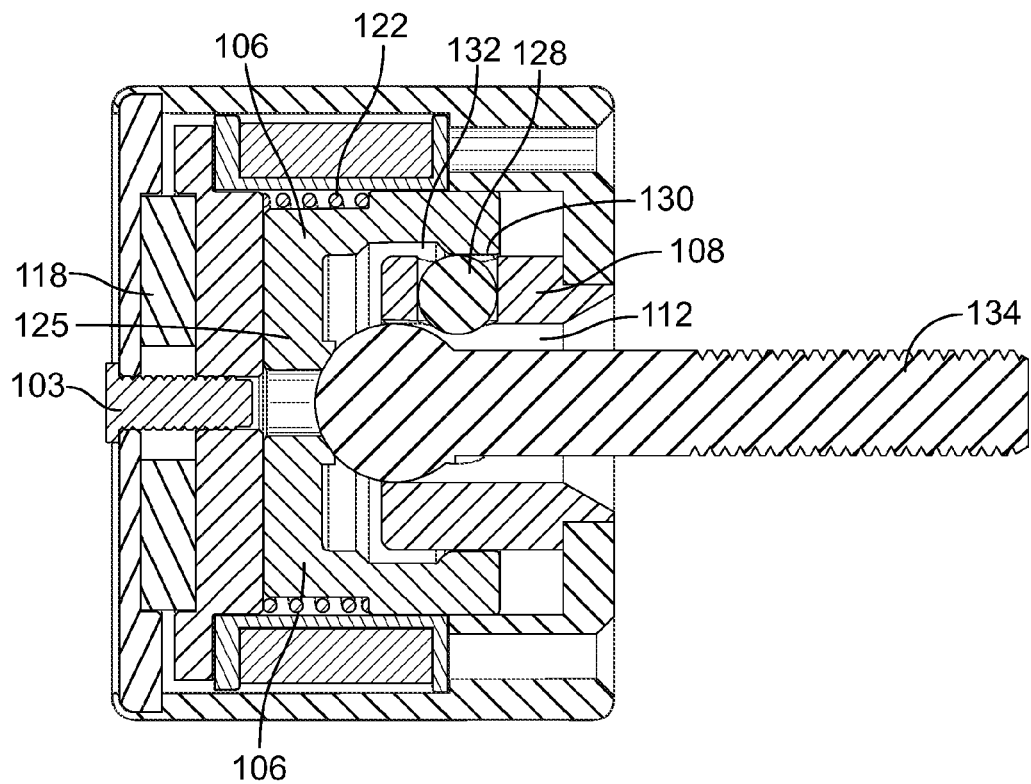
FIG. 20 is a cross sectional view of the third alternate embodiment taken longitudinally across the coupling in the locked position with the lockable rod fully inserted into the coupling thus forcing the plunger toward the permanent magnet.
Figure 21:
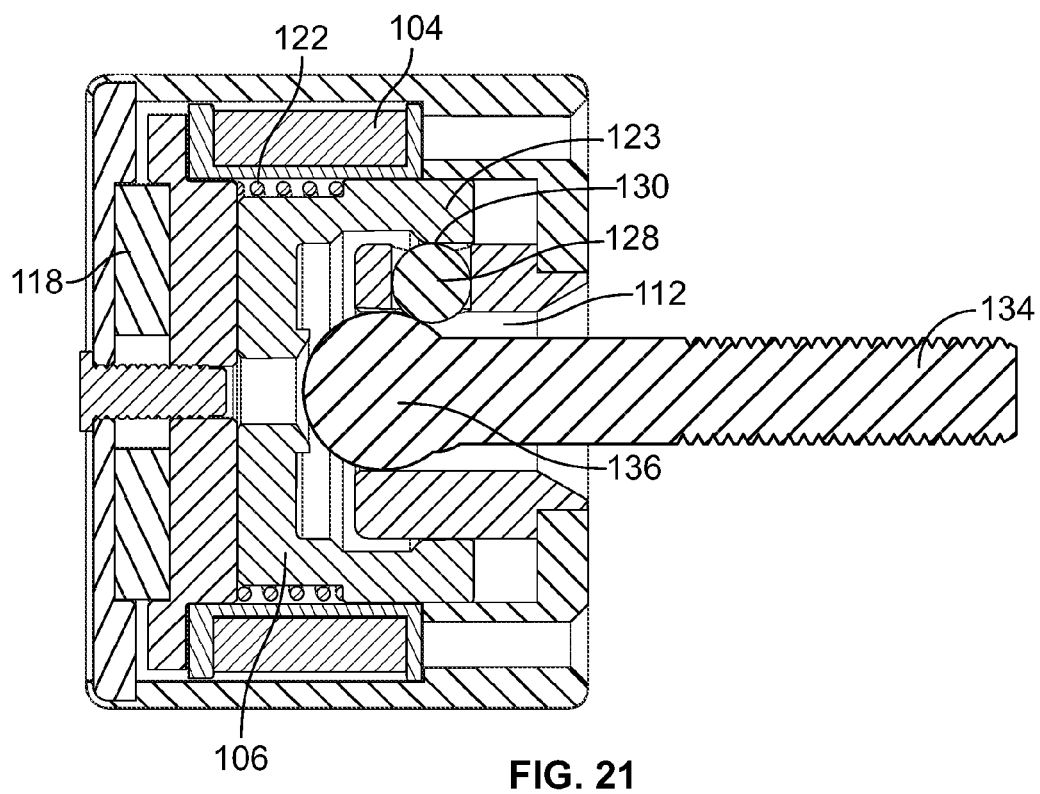
FIG. 21 is a cross sectional view of the third alternate embodiment taken longitudinally across the coupling in the locked position with the lockable rod locked in the coupling by the ball bearings.

FIG. 20 shows the lockable rod 134 pushing the plunger 106 further into the solenoid operated locking mechanism 100 and the plunger 106 pushed against the shunt washer 120. The ball nose 136 is pushed slightly past the ball bearing 128 so that the ball bearing 128 drops out of the recess 132 and enters the locking chamber 112. The sleeve 108 is designed to retain the ball bearing 128 so it is not fully released and will not completely drop into the locking chamber 112. As can be seen in FIG. 20, a portion of the ball nearing 128 extends into the locking chamber 112. The conical spring 122 is further compressed. The locking flat area 130 on the plunger 106 contacts the ball bearing 128 thus keeping a portion of the ball bearing 128 in the locking chamber 112. The magnetic field of the permanent magnet 118 through the shunt washer 120 holds the plunger 106 in the locked position. In this position the solenoid operated locking mechanism 100 is in the de-energized locked position with the lockable rod 134 fully inserted into the coupling 100 and the plunger 106 being held in place by the permanent magnet 118. In this position the lockable rod 134 cannot be removed from the solenoid operated locking mechanism 100 without damaging the coupling until the solenoid operated locking mechanism is unlatched. This is illustrated in FIG. 21 wherein the lockable rod 134 is attempted to be removed from the solenoid operated locking mechanism 100, but the ball bearing 128 is held in place by the flat area 130 on the plunger, which restricts the withdrawal of the lockable rod 134 from the solenoid operated locking mechanism 100.

To unlock the solenoid operated locking mechanism 100, the solenoid coil 104 is momentarily energized with a short electrical pulse of opposite polarity to the permanent magnet 118. This reduces the permanent magnetic field from the permanent magnet 118 through the shunt washer 120. The combination of the reduction of the force of the magnetic field and force of the compression spring 122 moves the plunger 34 in the direction of arrow F, which is toward the front of the solenoid coupling 100. The locking surface 124 of the plunger 106 moves forward until it engages the stopping wall 126. The ball bearing 128 is now received in the recess 132 in the plunger 106. The lockable rod 134 can now be withdrawn from the solenoid operated locking mechanism 100 as seen in FIG. 17. The solenoid operated locking mechanism 100 is ready to again receive the lockable rod 134 as it remains in this unlocked position without drawing any electrical power to maintain the unlocked position. It should be noted that in either the locked or the unlocked state, the permanent magnet and spring combination require no continuous energy to remain in that state.

Thus there has been provided a solenoid coupling that fully satisfies the objects set forth above. While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A solenoid operated coupling for connecting a solenoid body to a lockable head of a lockable rod comprising:
a solenoid body comprising a solenoid coil, a front and a rear,
a locking chamber extending from the front of the solenoid body and disposed within the solenoid body for receiving in locking engagement the lockable head of the lockable rod,
a solenoid operated plunger slidably mounted in the locking chamber,
at least one locking member mounted in the solenoid and adapted for movement into and out of the locking chamber in response to movement of the plunger,
the solenoid operated plunger allowing movement of the locking member into the locking chamber when the plunger is in a first unlocked position,
the solenoid operated plunger restricting the lockable head from moving past the locking member when the lockable head is in the locking chamber when the plunger is in a second locked position,
a recess in the solenoid operated plunger for receiving the locking member when the plunger is in the first unlocked position,
a permanent magnet mounted at the rear of the solenoid body,
a spring mounted between the permanent magnet and the plunger for providing a force against the plunger for pushing the plunger toward the front of the solenoid body,
the locking member engaging the lockable head to retain the lockable head in the locking chamber when the plunger is in the second locked position, the locking member being pushed out of the locking chamber by the movement of the lockable head to release the lockable head from the locking chamber when the plunger is moved to the first unlocked position,
the permanent magnet holding the plunger in locked engagement when the plunger is in the second locked position and releasing the plunger when the solenoid coil is energized.

2. The solenoid operated coupling of claim 1 and further comprising a locking member on the solenoid operated plunger, the locking member engaging the locking member to engage the lockable head when the plunger is in the second position.

3. The solenoid operated coupling of claim 1 wherein the lockable head comprises an enlarged ball shaped member.

4. The solenoid operated coupling of claim 2 wherein the locking member comprises at least one ball bearing mounted in an aperture in the solenoid body, the solenoid operated plunger controlling the movement of the ball bearing into and out of the locking chamber.

5. The solenoid operated coupling of claim 1 wherein the spring moves the plunger between the second locked position to the first unlocked position when the solenoid coil is energized.

6. A solenoid operated coupling for connecting a solenoid body to a lockable head of a lockable rod comprising:
a solenoid body comprising a front, a rear, a locking chamber with chamber walls and an entrance passageway at the front of the solenoid body in communication with the locking chamber,
a plunger mounted in the solenoid body and adapted for movement in response to selectively energizing the solenoid coil,
a ball bearing mounted in an aperture in the chamber wall, the ball bearing having a portion adapted for movement into and out of the locking chamber,
the plunger having a locking member and a recess portion, the locking member adapted for engaging the ball bearing and pushing the ball bearing into the locking chamber and the recess portion adapted for receiving the ball bearing when the ball bearing is pushed out from the locking chamber by the lockable head,
the ball bearing engaging the lockable head for restricting the movement of the lockable head when the locking member engages the ball bearing and allowing the lockable head to move past the ball bearing when the recess portion receives the ball bearing,
a permanent magnet mounted at the rear of the solenoid body, the permanent magnet holding the plunger in locked engagement when the plunger is pushed into close proximity to the permanent magnet by the lockable head whereby the plunger is magnetically held by the permanent magnet until the solenoid coil is energized thereby cancelling the permanent magnetic field and releasing the plunger.

7. The solenoid operated locking mechanism of claim 6 and further comprising a spring mounted between the permanent magnet and the plunger, the spring pushing the plunger toward the front when the solenoid coil is energized, causing the plunger to slide forward to a position where the ball bearing is received in the recess which receives the ball bearing allowing the head to be withdrawn from the locking chamber.

8. The solenoid operated locking mechanism of claim 7 wherein the lockable head comprises an enlarged ball shaped member.

9. The solenoid operated locking mechanism of claim 6 wherein when the plunger is magnetically held by the magnet, the locking member of the plunger engages the ball bearing and forces the ball bearing into the locking chamber restricting the movement of the lockable head past the ball bearing.

* * * * *